United States Patent [19]

Pei

[11] 4,084,576
[45] Apr. 18, 1978

[54] BULB-TYPE SOLAR ENERGY COLLECTOR

[75] Inventor: Yu Kun Pei, Toledo, Ohio

[73] Assignee: Owens-Illinois, Inc., Toledo, Ohio

[21] Appl. No.: 682,705

[22] Filed: May 3, 1976

[51] Int. Cl.[2] .............................................. F24J 3/02
[52] U.S. Cl. .................................... 126/270; 126/271
[58] Field of Search ............... 126/270, 271; 237/1 A; 136/206; 240/41 SB, 41 SL, 41.3, 41.5, 7.1 R; 350/293, 299

[56] References Cited

U.S. PATENT DOCUMENTS

| | | | |
|---|---|---|---|
| 761,596 | 5/1904 | Moss | 126/271 |
| 1,424,932 | 8/1922 | Moreau | 126/271 |
| 1,575,309 | 3/1926 | Anderson | 126/271 |
| 1,696,003 | 12/1928 | Harvey | 126/271 |
| 2,262,629 | 11/1941 | Wright | 339/146 X |
| 3,493,291 | 2/1970 | Webb | 126/270 |
| 3,943,911 | 3/1976 | Yu | 126/271 |
| 3,952,724 | 4/1976 | Pei | 126/271 |
| 3,960,136 | 6/1976 | Moan et al. | 126/271 |
| 3,982,527 | 9/1976 | Cheng et al. | 126/271 |
| 4,002,160 | 1/1977 | Mather, Jr. | 126/271 |

Primary Examiner—Kenneth W. Sprague
Assistant Examiner—Larry Jones
Attorney, Agent, or Firm—John R. Nelson; Myron E. Click; David H. Wilson

[57] ABSTRACT

There is disclosed a molded glass bulb-type solar collector which includes a parabolic specular reflector member and integral glass tubular member closed at the inner end extends along the focal axis of the reflecting surface. A shank portion of the tubular member extends outside the parabolic reflector and is open at the outer end. The tubular wall has its outside surface within the reflector coated with a wave length selective coating. A transparent glass cover plate that is preferably convex (domed) is sealed over the large open end of the reflector at a peripheral flange. The flange is formed to a regular geometric configuration, viz, square, diamond, hexagon, etc., and several of the bulb collectors are fabricated into a curtain wall with these flanges in adjacent relationship. The space within the cover plate and reflector is pumped to a vacuum.

The shank portion of the member is connected into an aperture of a manifold. The collectors are connected in series wherein working fluid is carried in a conduit, and at each aperture, a partition extends into the tubular member bisecting it so that the fluid on one side of the partition is diverted in a counterflow path therethrough and back to the conduit on the other side of the partition. In another form of manifold, collectors are connected in parallel, so to speak, wherein two parallel divided passages are provided in the manifold.

21 Claims, 8 Drawing Figures

BULB-TYPE SOLAR ENERGY COLLECTOR

The present invention relates to a solar energy collector apparatus for collecting energy from the rays of the sun on an absorber surface and exchange of the collected energy as heat to a working media, such as air or water, circulated through the apparatus. More particularly, the invention relates to a bulb-type solar collector unit having a parabolic mirror surface and a tube-type absorber whose axis is on the focal axis of the parabola of the mirror surface.

THE INVENTION RELATED TO THE PRIOR ART

Although parabolic reflector devices of this general type have been disclosed in the prior art, for example see U.S. Pat. Nos. 1,575,309 (1926); 2,460,482 (1949) and 3,130,084 (1964), the present invention is directed to a vacuum sealed unit having essentially all glass parts in the construction and possessing improved thermal properties. Since the unit is subjected to a range of temperature variations (heating and cooling of the parts thereof), the sealed together parts perform in a superior manner due to the glass construction thereof. In other words, the assembly of glass parts has a nearly uniform thermal coefficient of linear expansion and contraction providing a practical and durable unit in operation.

In the present invention, by encasing the absorber element of the apparatus in a vacuum within the parabolic glass reflector, heat loss through convection and conduction is reduced to a minimum. Furthermore, to reduce heat loss by radiation or re-radiation, the exposed surface of the absorber element is minimized. In addition, the life expectancy of the selective coating on the absorber element will be enhanced.

The prior art parabolic focusing type of solar collectors, such as set forth in the earlier mentioned U.S. patents, are cumbersome and large installations not suited for residential dwellings or "homeowner" uses. The present invention provides an economical and inexpensive focusing collector adaptable for homeowner use as well as for the larger demand type installations. Moreover, as distinguished from prior collectors of this type, the present invention provides a collector array which needs not "track" the sun when in daily use through the use of elaborate filtering or orienting mechanisms. Yet, the collector of this invention is capable of providing operating temperatures high enough to develop mechanical power, i.e. through hot water, steam or the like.

The collector of the present invention, being constructed of glass parts, may be manufactured and assembled by utilizing conventional equipment, such as glass forming equipment suitable for pressing and blow molding glass articles. The collector, in one form of use of the invention, may be shaped into interfitting or interlocking assemblies (likened to laying out tile or roofing pieces) to provide a surface (viz a curtain wall) that is impervious to weather when situated on a favorable solar exposure of a building, e.g. the roof or a wall surface.

SUMMARY OF THE INVENTION

The solar collector element comprises a molded glass bulb-type envelope which has an interior parabolic specular reflecting surface and an enclosed coated glass absorber tube located inside the bulb envelope on the focal axis of a paraboloid of revolution. The front facing area of the bulb is covered by a transparent glass cover plate which may be nearly flat or curved, depending upon the desired installation, and the absorber tube is thereby enclosed in the space within the face plate and bulb. The interior of the bulb envelope is evacuated to a vacuum condition. The exterior surface of the glass absorber tube has an opaque coating of a solar energy absorbing material of a type hereinafter disclosed to absorb the solar energy focused thereon by the parabolic reflector surface. The tubular absorber portion of the bulb has its innermost end closed and the opposite end open such that in the assembly, the glass of the bulb at the apex region of the parabolic reflector is formed integral with the exterior of the glass absorber tube as a sealed unit and the open end of the absorber tube is directed outside the base of the parabolic reflector bulb, so to speak, at the apex of the bulb. The collector is in the form of a sealed container unit.

One significant feature of the invention is the means in the structure by which radiation heat loss is reduced. This is accomplished by keeping the exposed surface area of the absorber member to a minimum. This invention provides a practical solution to radiation heat loss by using a vertically disposed tubular absorber member of short length disposed along the axis of a parabolic reflector surface of relatively large surface area.

A manifold of the apparatus delivers a working heat exchange media, such as air or water, into the protruding open shank end of the absorber tube for circulation therein to its closed end and back to the open end thereof into the manifold. The media circulation may be in series between a number of the bulb collectors or in a parallel connection to a plurality of the collectors. The face of each collector includes a glass face plate. The faces of the bulb collectors will, of course, be arranged on a plane facing the sun. Several of the bulb collectors may be arranged in an array and interconnected to form a facing or impervious surface at the sun facing plane, thereby providing a curtain wall or roofing effect for the installation. To achieve this, a peripheral outwardly extending flange is molded on each bulb at the match plane for the lens and body of the bulb. The flanges of adjacent bulbs are placed in an abutting relationship and sealed together with a grouting or otherwise fitted together with firring strips. From the standpoint of appearance in a wall or curtain of the collectors, the face plates should be nearly flat or planar, however, the bulbs are under a heavy vacuum and to achieve a greater strength-to-weight ratio for a given bulb size, a domed or curved face plate is preferable.

As described more particularly hereinafter, the parts of the bulb-type collector are molded in glass in an integral one-piece assembly fitted with a separate face plate. the separate face plate is a pressed glass piece.

The bulb collectors are assembled onto a manifold apparatus by inserting an outwardly depending hollow shank thereof into an aperture formed in the manifold. In one form of the invention, the shank is sealed in the manifold aperture by rubber ring gasket or ring grommet seals. In another form of the invention, the shank is molded with threads. The aperture of the manifold has mating threads formed therein with a gasket seat which seals the connection.

The fluid from the manifold is circulated into and along the length of the absorber tube of the bulb and back into the manifold by fluid handling means extending into the hollow absorber tube. Circulation of the working fluid through each of the bulb collectors continuously removes the heat energy of the solar radiation collected on the absorption surface of the absorber tube. The solar radiation is focused onto the absorber tube surface by the mirrored specular paraboloid surface of revolution at the interior of the bulb body. Relatively high temperatures may be developed in the working fluid by the apparatus of this invention.

Other advantages of the invention will be more readily apparent to those skilled in the art from the following detailed description of the drawings on which:

DESCRIPTION OF THE INVENTION

Figure 1:
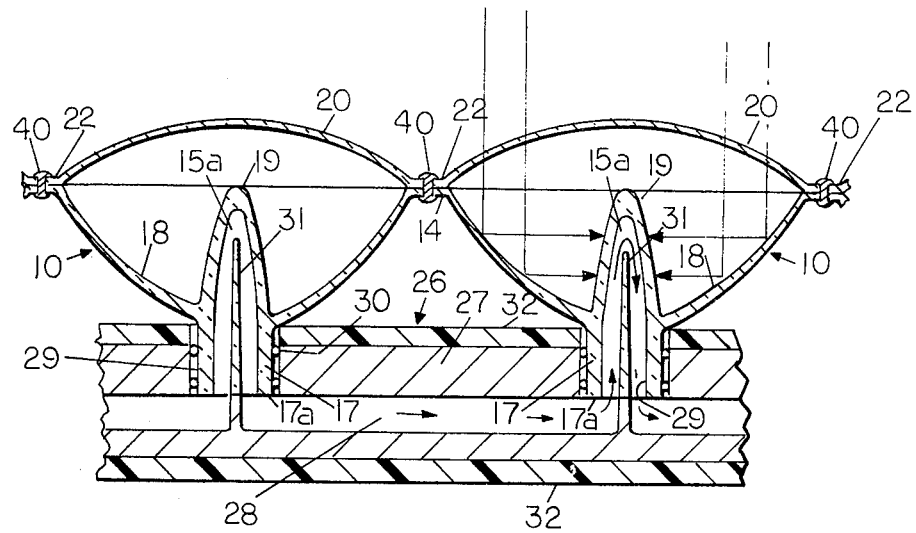
FIG. 1 is a sectional elevational view of the bulb collectors connected to a manifold.
Figure 2:
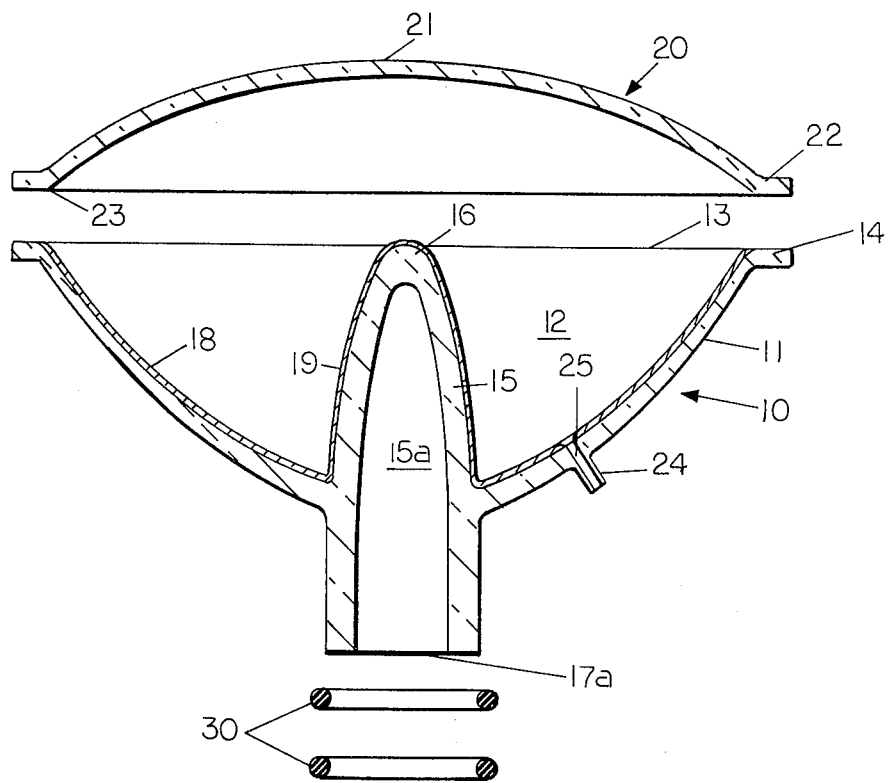
FIG. 2 is an enlarged sectional elevational view of the bulb collector of FIG. 1, illustrating the assembly of the parts.

Referring to FIGS. 1 and 2, a bulb body 10 is molded, such as by pressing or pressing and blowing glass in a mold (not shown) to form an integral piece. The bulb body 10 comprises a curved wall 11 defining on its interior surface 12 a paraboloid of revolution generated about a central axis which is the focal axis for surface 12, or joined segments or segmented parabolic surfaces which define a concave surface having an enlarged open end and a smaller apex end, which surface 12 of such form and definition is hereinafter called a "parabolic surface". There is a large end opening of the bulb defined at the perimeter edge 13 and a laterally, outwardly projecting flange 14 which encompasses the bulb thereat. Along the central axis of parabolic surface 12 there is an integral, tapered, tubular wall 15 whose longitudinal axis coincides with the central focal axis of the parabolic surface. The innermost end 16 of wall 15 is closed and the tubular wall 15 merges with the glass of wall 11 of the bulb encircling the apex of parabolic surface 12. A tubular shank 17 forms an integral extension of tubular wall 15 and provides the means by which the bulb collector is connected into a manifold system, to be described more particularly hereinafter.

The glass bulb body 10, just described, is treated to receive two different coatings, as follows. First the parabolic surface 12 has applied thereto a thin specular coating 18 of a silver or the like, to form a specular mirror finish throughout the parabolic surface to the juncture with the base of the tubular wall. Next, the exterior surface of wall 15 including its closed end 16 receives a coating 19 which takes the form of a wave length selective coating or a highly efficient energy absorbing coating. The tubular glass 15, 16 with the coating 19 thereon comprises the absorber tube of the collector. The absorber tube will be disposed axially (vertically) in the unit with its axis generally aimed at the sun. The absorber is of small surface area compared to the relatively large surface area of the reflector surface 12. This contributes greatly to a minimal radiation heat loss from the unit by having the absorber of small surface area.

A face plate or cover plate 20 is formed of transparent glass and includes preferably a circular outwardly domed section 21, (however, the outer face of cover plate 20 may be planar or flat) and an integral peripheral flange 22. The perimeter of the inner edge 23 of the domed section of the face plate matches the circular edge 13 on the bulb body, and the flange 22 matches the peripheral flange 14.

A tubulation 24 is formed on the glass wall 15 of the bulb which includes an aperture 25. The bulb and face plate are now assembled and joined together at the matched flanges 14, 22. This is most conveniently done by fusion of the two mating flanges of glass. The interior space or chamber within the bulb is next evacuated by connecting a vacuum pump at tubulation 24 and combined with a bake out the interior of the bulb collector is drawn down to a vacuum of $10^{-4}$ torr or more; whereupon, tubulation 24 is tipped off and sealed in the known manner. The vacuum chamber within the bulb collector reduces the convection and conduction of heat losses of the unit.

As shown on FIG. 1, the bulb collectors are assembled onto a manifold 26 connected in a system for circulating a working medium, i.e. air of water. The manifold may take several forms, one of which is illustrated on FIG. 1 and a second form is illustrated on FIG. 6 (to be described later herein). Manifold 26 includes a wall 27 which defines a passage or conduit 28. Apertures 29 extend through the wall 27 for receiving shank 17 of the bulb collectors. In the wall of each of the apertures 29 there are provided plural annular groove or seats to receive the O-rings 30 which seal the glass shank 17 in the manifold. The bulb collectors are pressed into the apertures on assembly such that the end 17a of the shank is about even with conduit 28; or is pulled therefrom in dissassembly, as needed for maintenance and repair to the bulb collectors in the installation. Thus, the solar collector installation may be made at the dwelling. or the site of use in a simplified manner with a minimal use of tools and fixtures. The working fluid media is circulated through the collectors as seen by the arrows on FIG. 1, by vertical partition members 31 which depend upwardly from the floor of conduit 28. The partitions are of a shape so that they fit snugly inside the chamber 15a of the absorber tube in a diametrical placement such that the space of interior 15a of each absorber tube is approximately bisected. Partition members 31 are spaced from the interior of closed end 16 of the absorber tube allowing counter flow circulation of the media through the inside of each absorber tube. The flow may be in either direction, the media flow on FIG. 1 being indicated from left to right.

Manifold 26 also includes a complete exterior layer 32 of sufficient thickness of an insulation, such as a foamed (cellular) polyurethane or the like. Preferably, the exposed exterior of insulation layer 32 is coated or painted with a sealer, such as a plastic or paint, to close any cellular structure and provide a more durable exterior to the unit.

As may be seen, for example as illustrated by the ray lines on the right hand bulb of FIG. 1, the sun's rays pass through the face plate and either strike the energy absorbing surface 19 of the absorber tube directly or strike the mirror surface 18 of parabolic reflector 12. The rays impinging upon the mirror surface of the parabolic reflector are reflected to the focal axis of the paraboloid of revolution whereat they strike the coated outer surface of the relatively short tubular absorber. The vacuum in the space inside the bulb prevents loss of energy from convection and conduction. The highly efficient coating 19 on the absorber tube further reduces radiation losses and retains the energy on the tube 15. The bulb collector unit is higher efficient for collection of the energy of the sun's rays. Circulation of working media through the interior of the absorber tube, such as described, exchanges the absorbed heat of the sun's energy thereto which is carried by the working media through the manifold 26 to the next bulb collector, and so forth, in series. The wave selective coatings should have the property of very high absorption (preferably more than 0.8 absorption in wave lengths less than 2.5 microns) and very low emission (preferably less than 0.1 emission in the infra-red wave lengths, more than 2.5 microns).

CURTAIN WALL INSTALLATION

Figure 3:
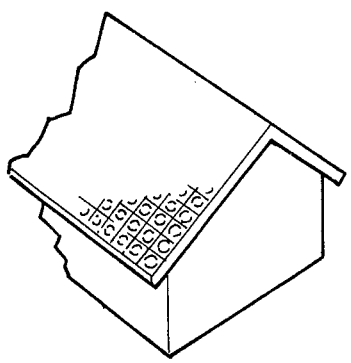
FIG. 3 is a perspective view showing a curtain wall installation of the bulb collectors on the roof of a dwelling.
Figure 3A:
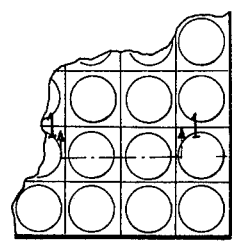
FIG. 3A is an enlarged plan view of several of the bulb collectors assembled together in the curtain wall of FIG. 3.
Figure 4:
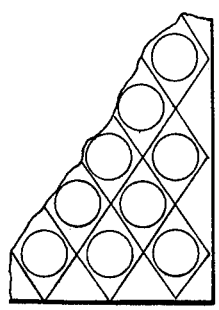
FIG. 4 is a plan view of several of the bulb collectors showing a modification of the construction of the bulbs for interfitting them in a curtain wall.
Figure 5:
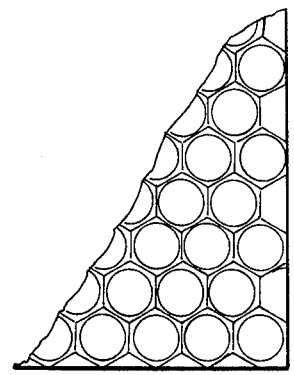
FIG. 5 is a plan view of several of the bulb collectors showing a further modification of the construction of the bulbs for interfitting them in a curtain wall.
Figure 7:
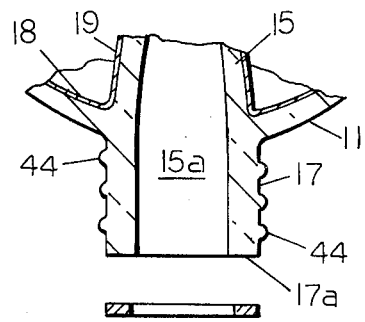
FIG. 7 is an exploded view in section of the end of the bulb-shank and gasket in the manifold taken from FIG. 6.

As shown in FIGS. 3-5, the bulb collectors may be utilized as a curtain wall installation that affords resistance to weather and the like. The several bulb collectors may be placed in side-by-side arrangements with their sealed together flanges 14, 22 abutting each other. A suitable grouting compound or cement 40 is forced in the seams around the flanges sealing the exposed plane of the collectors from leakage, which produces run-off of snow and rain or the like to keep the curtain wall from sun masking obstructions, etc. The cement 40 seals the seams, as shown in FIG. 1 in section.

Various pattern effects or layouts may be obtained, as shown on FIGS. 3-5, by variations in the geometric configurations of the perimeter flanges 14, 22 of the bulb collectors. For example, the flanges are square shaped at their periphery on the type shown on FIG. 3. The bulbs may be installed in rows on a straight manifold channel in each row and selected manifold "straights" interconnected for flow of the working media.

Another configuration is shown on FIG. 4. The periphery of the bulbs (in essence the same as in FIG. 3, or "squares") are aligned as diamonds, again stacked in rows across the curtain wall.

A further configuration is shown on FIG. 5 wherein the peripheral configuration of the flanges is hexagonally shaped and laid up in a curtain wall as such. The flange areas are preferably as small as possible to obtain the most exposure of the sun's rays on face plate areas of the curtain wall.

MODIFIED BULB AND MANIFOLD

Figure 6:
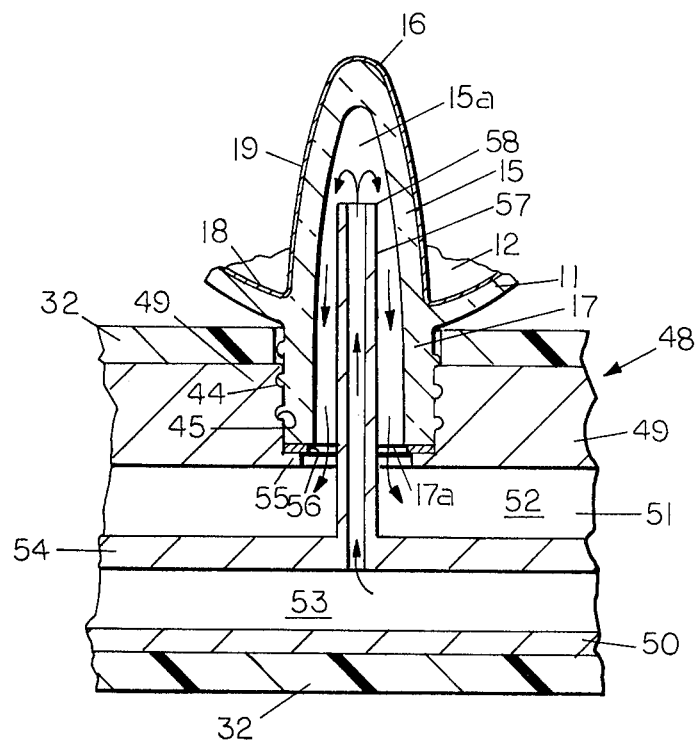
FIG. 6 is a fragmentary sectional elevational view of a modified bulb collector illustrating a further variant for connecting them into a manifold and for circulation of working media therein by the manifold.

FIG. 6 illustrates certain modifications of the bulb collector and manifold which may be employed. The body of the bulb is molded such that glass threads 44 are formed along the annular outer surface of shank 17. In other respects, the bulb collector is the same as described.

A manifold 48 is comprised of a top wall 49 and bottom walls 50 and opposed side walls 51 which define a conduit that is divided longitudinally into upper end lower passageways, 52 and 53, respectively, by a central wall 54 extending sidewise of the conduit from opposite side walls 51. The apertures in wall 49 include threads 45 which correspond with matching threads 44 on the bulb shank 17. An annular gasket seat 55 is formed at the bottom of the apertures and retains a washer-like gasket 56 which is compressed between the shank end face 17a and seat 55 upon screwing the bulb collector into the threaded manifold aperture. The absorber tube is thus sealed in the manifold. Working media is connected from the lower passageway 53 into the interior chamber 15a of the absorber tube by a delivery tube 57 which has its upper open end 58 spaced from the closed end 16 of the absorber. Flow of the working media is shown by the arrows on FIG. 6, in which cooler media flows from passage 53 into the absorber and exchanges heat with the glass wall 15. The heated media returns to passageway 52. This manifold is connected with the collectors in a parallel arrangement. As described in FIG. 1, the manifold is encased in a suitable layer of insulation material 32, such as a foamed (cellular) polyurethane insulation grade material.

Having illustrated and described several embodiments of the invention herein, it should be understood that further modification may be resorted to without departing from the spirit of the invention and scope of the appended claims.

What is claimed is:

1. A solar collector apparatus comprising a unitary hollow glass member defining
    an endless annular parabolic wall surface disposed about a focal axis having an enlarged open end and an apex end, and
    an elongated hollow tubular wall coaxial with said axis at said apex end of the parabolic surface, and inwardly depending along the focal axis and encircled by said parabolic surface, the inner depending axial of end of said tubular wall being closed and the opposite axial end thereof being open and disposed outwardly of the apex end of the parabolic surface, said tubular wall defining an internal fluid chamber,
    a continuous reflective coating layer on said parabolic surface and facing the focal axis,
    an energy absorbing coating on the outer surface of the tubular wall disposed within said encircling parabolic surface,
    a transparent glass cover member for covering the enlarged open end of said unitary member, and
    means for sealingly connecting the glass cover member about the periphery of said open end of the parabolic wall of the said hollow glass member thereby providing a sealed closed chamber of the latter, said chamber being evacuated to subatmospheric pressure.

2. The solar collector apparatus of claim 1 in which the said opposite axial open end of said tubular wall includes an integral tubular shank portion depending outside of the parabolic wall surface at the apex end of the latter and integral external thread means on the tubular shank portion adjacent its open end.

3. The solar collector apparatus of claim 2, including in combination therewith a hollow manifold conduit comprised of a wall and a threaded aperture through said wall matching the threads of said shank portion of the hollow glass member for fastening the latter to said manifold wall by said matching threads, and a gasket member in said aperture sealing said connection of the manifold and the shank portion of said hollow glass member.

4. A solar collector apparatus comprising a unitary, integrally molded hollow glass member defining a parabolic wall surface disposed about a focal axis having an enlarged open end and an apex end, and an integral elongated hollow tubular wall coaxial with said axis at said apex end of the parabolic surface, and inwardly depending along the focal axis and encircled by said parabolic surface, the inner depending axial end of said tubular wall being closed and the opposite axial end thereof being open and disposed outwardly of the apex end of the parabolic surface, said tubular wall defining an internal first chamber, a continuous reflective coating layer on said parabolic surface and facing the focal axis, an energy absorbing coating on the surface of the tubular wall that is disposed within said focal axis, a transparent glass cover member for covering the enlarged open end of said member, and means for sealingly connecting the glass cover member about the periphery of said open end of the parabolic wall of the hollow member thereby providing a sealed, second chamber, said second chamber being evacuated to at least a partial vacuum.

5. The solar collector apparatus of claim 4, wherein the continuous reflective coating on said wall surface comprises a specular reflective surface.

6. The solar collector apparatus of claim 4, wherein the cover member has a convex outer face over the area thereof covering the enlarged open end of the hollow glass member.

7. The solar collector apparatus of claim 4 wherein the tubular wall is coated on its exterior surface inclusive of the closed end thereof with said energy absorbing surface coating layer.

8. The solar collector apparatus of claim 7, wherein the energy absorbing coating layer comprises a wave length selective coating having absorption of more than 0.8 in wave lengths below 2.5 microns and emission of less than 0.1 in wave lengths 2.5 microns and above.

9. A solar energy collector apparatus comprising a plurality of hollow glass collector members each defining a parabolic wall surface disposed about a focal axis having an enlarged open end defined by a peripheral flange and an apex end, the peripheral flange extending substantially normal to the focal axis, and the perimeter of the flange being of regular geometric configuration, an elongated hollow tubular wall coaxial with said axis at said apex end of the parabolic surface, and depending along the focal axis within said parabolic surface, the inner depending axial end of said tubular wall being closed and the opposite axial end thereof being open and disposed outwardly of the apex end of the parabolic surface, the tubular wall defining a fluid chamber, a reflective coating on said parabolic surface facing the focal axis, an energy absorbing coating on the surface of the tubular wall disposed along said focal axis, a transparent glass cover member for covering the enlarged open end of said member, and means for sealingly connecting the glass cover member about the periphery of said open end of the parabolic wall of the hollow member thereby providing a sealed closed chamber, said chamber being evacuated to at least a partial vacuum, the plural collector members having their peripheral flanges in adjacent side-by-side relationship, and means connecting the adjacent surfaces of the peripheral flanges of the collector members for sealing them into a curtain wall.

10. The solar collector apparatus of claim 9, wherein the perimeter of the flanges of said plural collector members square-shaped configuration.

11. The solar collector apparatus of claim 9, wherein the perimeter of the flanges of said plural collector members are diamond-shaped configuration.

12. The solar collector apparatus of claim 9, wherein the perimeter of the flanges of said plural collector members are hexagonally-shaped configuration.

13. The solar collector apparatus of claim 9, wherein the means connecting the adjacent surfaces of the plural collector flanges comprises a grouting compound sealing the exposed plane of the plural collectors from leakage for providing a curtain wall of the collectors.

14. A solar collector apparatus comprising a unitary hollow glass member defining a parabolic wall surface disposed about a focal axis having an enlarged open end and an apex end, an integral elongated hollow tubular wall coaxial with said axis at said apex end of the parabolic surface, and depending along the focal axis within said parabolic surface, the inner depending axial end of said tubular wall being closed and the opposite axial end thereof being open, the opposite axial end including a tubular wall shank portion depending outside of the apex end of the parabolic surface, the tubular wall defining a fluid chamber, a reflective coating on said parabolic surface facing the focal axis, an energy absorbing coating on the surface of the tubular wall disposed along said focal axis, a transparent glass cover member for covering the enlarged open end of said member, and including means for sealingly connecting the glass cover member about the periphery of said open end of the parabolic wall of the hollow member thereby providing a sealed closed chamber, said chamber being evacuated to at least a partial vacuum, and in combination therewith a manifold providing for flow of a working fluid, said manifold including means to receive said shank portion of the hollow tubular wall and sealingly connect same into the manifold, and means for introducing working fluid from the manifold internally of the tubular wall for heat exchange therewith and returning the solar energy laden working fluid to said manifold.

15. The solar collector apparatus of claim 14, wherein the means for introducing working fluid from the manifold into the tubular wall and return to the manifold comprises a partition means blocking flow in said manifold and extending into said tubular wall member bisecting the interior chamber of the latter, whereby flow of working fluid in the manifold on one side of the partition means is diverted thereby for counterflow along the interior of the tubular wall and return to the manifold on the other side of said partition means.

16. The solar collector apparatus of claim 15, in which the shank portion of said tubular wall is sealingly connected in an aperture in the manifold and in communication with said conduit, by an annular gasket means compressed between the exterior of said shank portion and the manifold aperture perimeter.

17. The solar collector apparatus of claim 16, including a layer of thermal insulating material encasing the manifold.

18. The solar collector apparatus of claim 17, in which said thermal insulation on the manifold comprises a layer of foamed polyurethane.

19. The solar collector apparatus of claim 14, wherein the means for introducing working fluid from the manifold into said tubular wall comprises a longitudinal wall means dividing the manifold into two substantially parallel passageways, an aperture in the manifold connected to one of the passageways and receiving the shank portion of said member, a delivery tube axially disposed through said aperture and connected to the other of said passageways, said delivery tube extending internally of said tubular wall and spaced from the closed end thereof, whereby flow of working fluid in the other said passageway of the manifold is conducted by said delivery tube into the tubular wall for flow in a counterflow pattern therein and into the one said passageway of the manifold, the working fluid being heated by the flow within the tubular wall member.

20. The solar collector of claim 19, in which said shank portion includes threads on its exterior surface and the perimeter of the manifold aperture has matching threads thereon, the shank portion being sealingly connected to the manifold at said aperture.

21. The solar collector of claim 20, in which the manifold aperture includes an annular interior retainer wall and gasket thereon, the shank portion of said member being sealed in the manifold by compressing the gasket between said retainer wall and said shank portion, and a layer of thermal insulating material encasing the manifold.

* * * * *

UNITED STATES PATENT AND TRADEMARK OFFICE
CERTIFICATE OF CORRECTION

PATENT NO. : 4,084,576

DATED : April 18, 1978

INVENTOR(S) : Yu Kun Pei

It is certified that error appears in the above-identified patent and that said Letters Patent are hereby corrected as shown below:

Col. 5, line 18, "higher" should be -- highly --.

Col. 6, line 5, "end" should be --and--.

Col. 6, line 43 (claim 1) after "axial" delete -- of -- (first occurrence).

Signed and Sealed this

Nineteenth Day of September 1978

[SEAL]

Attest:

RUTH C. MASON
*Attesting Officer*

DONALD W. BANNER
*Commissioner of Patents and Trademarks*